United States Patent
Huai et al.

(10) Patent No.: US 6,175,476 B1
(45) Date of Patent: Jan. 16, 2001

(54) SYNTHETIC SPIN-VALVE DEVICE HAVING HIGH RESISTIVITY ANTI PARALLEL COUPLING LAYER

(75) Inventors: Yiming Huai, Pleasanton; Marcos Lederman, San Francisco, both of CA (US)

(73) Assignee: Read-Rite Corporation, Milpitas, CA (US)

( * ) Notice: Under 35 U.S.C. 154(b), the term of this patent shall be extended for 0 days.

(21) Appl. No.: 09/135,939

(22) Filed: Aug. 18, 1998

(51) Int. Cl.[7] .................................................. G11B 5/127
(52) U.S. Cl. ....................................................... 360/324.11
(58) Field of Search ................................... 360/113, 126, 360/324.11, 324.2; 324/252, 207.21

(56) References Cited

U.S. PATENT DOCUMENTS

| | | | |
|---|---|---|---|
| 5,206,590 | 4/1993 | Dieny et al. | 324/252 |
| 5,465,185 | 11/1995 | Heim et al. | 360/113 |
| 5,650,958 * | 7/1997 | Gallagher et al. | 365/173 |
| 5,701,223 | 12/1997 | Fontana, Jr. et al. | 360/113 |
| 5,729,410 * | 3/1998 | Fontana, Jr. et al. | 360/113 |

OTHER PUBLICATIONS

Y. Huai and R.W. Cochrane. Oscillatory magnet coupling and magnetoresistive on Co/Re superlattices. *J. Appl. Phys.*, 72(6), Sep. 15, 1992.

* cited by examiner

*Primary Examiner*—Allen T. Cao
(74) *Attorney, Agent, or Firm*—Michaelson & Wallace

(57) ABSTRACT

The present invention provides an improved synthetic spin valve sensor having a high resistivity antiparallel coupling layer, typically formed of rhenium, between pinned layers. The spin valve sensor of the present invention may be formed having a layered structure as follows: pinning layer/ first pinned layer/high resistivity antiparallel coupling layer/ second pinned layer/metallic nonferromagnetic spacer layer/ free layer. Capping and seed layers typically are also included. The high resistivity of the antiparallel coupling layer of the present invention reduces shunt current through that layer to improve the GMR effect of the spin valve while maintaining sufficient antiparallel coupling between the pinned layers. The antiparallel coupling layer of the present invention also provides improved thermal stability.

23 Claims, 4 Drawing Sheets

SYNTHETIC SPIN-VALVE DEVICE HAVING HIGH RESISTIVITY ANTI PARALLEL COUPLING LAYER

BACKGROUND OF THE INVENTION

1. Technical Field

The present invention relates to field of magnetoresistive sensors and may be utilized to improve spin-valve sensors.

2. Background Art

Spin valve sensors exploit changes in electrical resistance which occurs as a result of manipulating the relative orientation of the magnetization of ferromagnetic layers within a spin valve sensor. In conventional spin valve sensors, one ferromagnetic layer has its magnetization pinned while another, which has its magnetization set perpendicular to the pinned layer, is free to change its magnetic orientation in response to magnetized bits on an adjacent recording media. The magnetized bits on the recoding media, therefore, change the relative magnetization between the pinned layer and the free layer. An induced current through the spin valve is used to detect changes in the resistance of the spin valve that results from changes in the relative magnetization of the pinned and free layers.

The conventional spin valve utilizes an antiferromagnetic pinning layer adjacent the pinned layer to pin the direction of the magnetization of the pinned layer. The free layer, which may be made of several layers, is separated from the pinned layer by a thin nonmagnetic metallic layer.

Synthetic or improved spin valve sensors employ additional layers between the pinned layer and free layer/layers to create a laminate structure. Two additional layers are added: a second ferromagnetic layer, and a non-ferromagnetic material layer which separates the pinned layer and the second ferromagnetic layer and creates antiparallel coupling between the pinned layer and the second ferromagnetic layer. The first ferromagnetic pinned layer, therefore, causes the second ferromagnetic layer to be pinned antiparallel to the first pinned layer. Such a structure improves the longitudinal biasing of the free layer and therefore the spin valve's dynamic range, thereby allowing improved recording density.

As discussed above, the magnetic moment on the magnetic media changes the resistance across the spin valve which can be detected by passing a current through the spin valve. The giant magnetoresistance, one measure of the performance of a spin valve, is given by:

$$GMR = (R\downarrow\uparrow - R\uparrow\uparrow)/R\uparrow\uparrow$$

where,

GMR is the giant magnetoresistance ratio $R\downarrow\uparrow$ is the resistance across the sensor when the magnetization of the layers are not aligned $R\uparrow\uparrow$ is the resistance across the sensor when the magnetization of the layers are aligned.

Spin valve layout and materials selection for the spin valve is critical to optimizing the GMR effect and sensor performance. It is an object of the present invention to provide an improved spin valve.

SUMMARY OF THE INVENTION

The present invention provides an improved synthetic spin valve sensor having a high resistivity antiparallel coupling layer between the pinned layers. The high resistivity antiparallel coupling layer typically is formed of rhenium.

The spin valve sensor of the present invention may be formed having a layered structure as follows: pinning layer/first pinned layer/high resistivity antiparallel coupling layer/second pinned layer/metallic nonferromagnetic spacer layer/free layer. Capping and seed layers typically are also included.

The antiparallel coupling layer of the present invention provides several advantages. The high resistivity of the antiparallel coupling layer of the present invention reduces shunt current through that layer which improves the GMR effect of the spin valve while maintaining sufficient antiparallel coupling between the pinned layers. The rhenium antiparallel coupling layer of the present invention also provides improved thermal stability.

A optional feature of the presently preferred embodiment of the improved spin valve is that it may be utilized to provide an improved data storage and retrieval apparatus. The data storage and retrieval apparatus may employ the improved spin valve sensor in a read head of the head assembly. The read head is used to detect the magnetic state of magnetized portions of a magnetic recording media as the media is moved by a motor with respect to the head assembly.

DETAILED DESCRIPTION OF THE PREFERRED EMBODIMENT OF THE INVENTION

Figure 1:
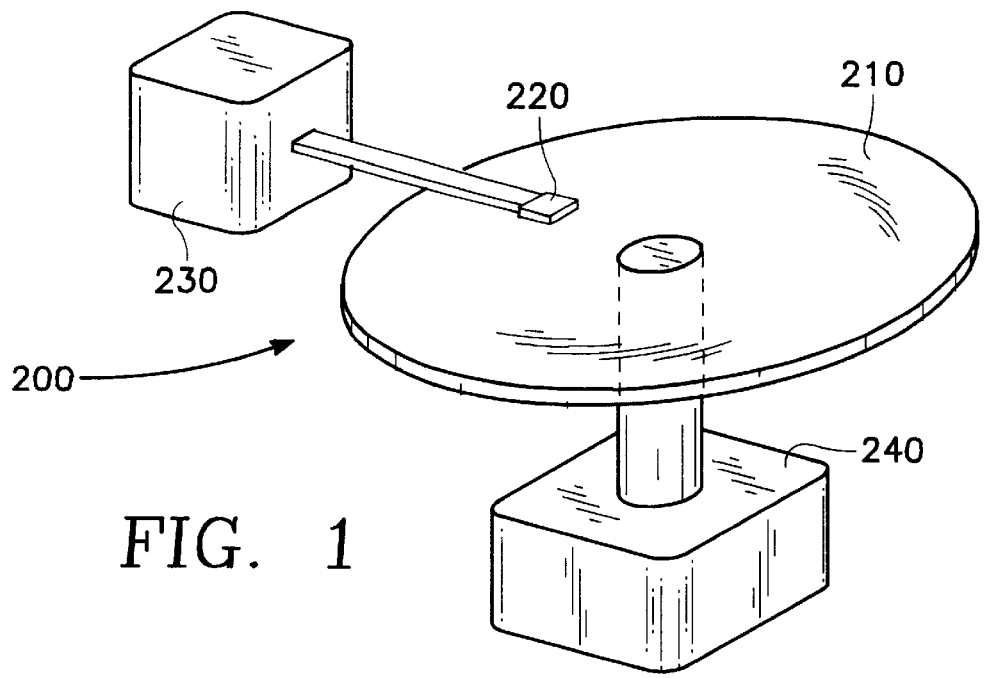
FIG. 1 illustrates a disk type magnetic data storage and retrieval apparatus.

FIG. 1 shows the improved spin valve sensor of the present invention embodied in a disk type magnetic data storage and retrieval apparatus 200. The improved spin valve of the present invention is located within a merged head assembly 220 which rides above a magnetic storage media 210, depicted in FIG. 1 as a rotatable hard disk type storage media. The hard disk is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
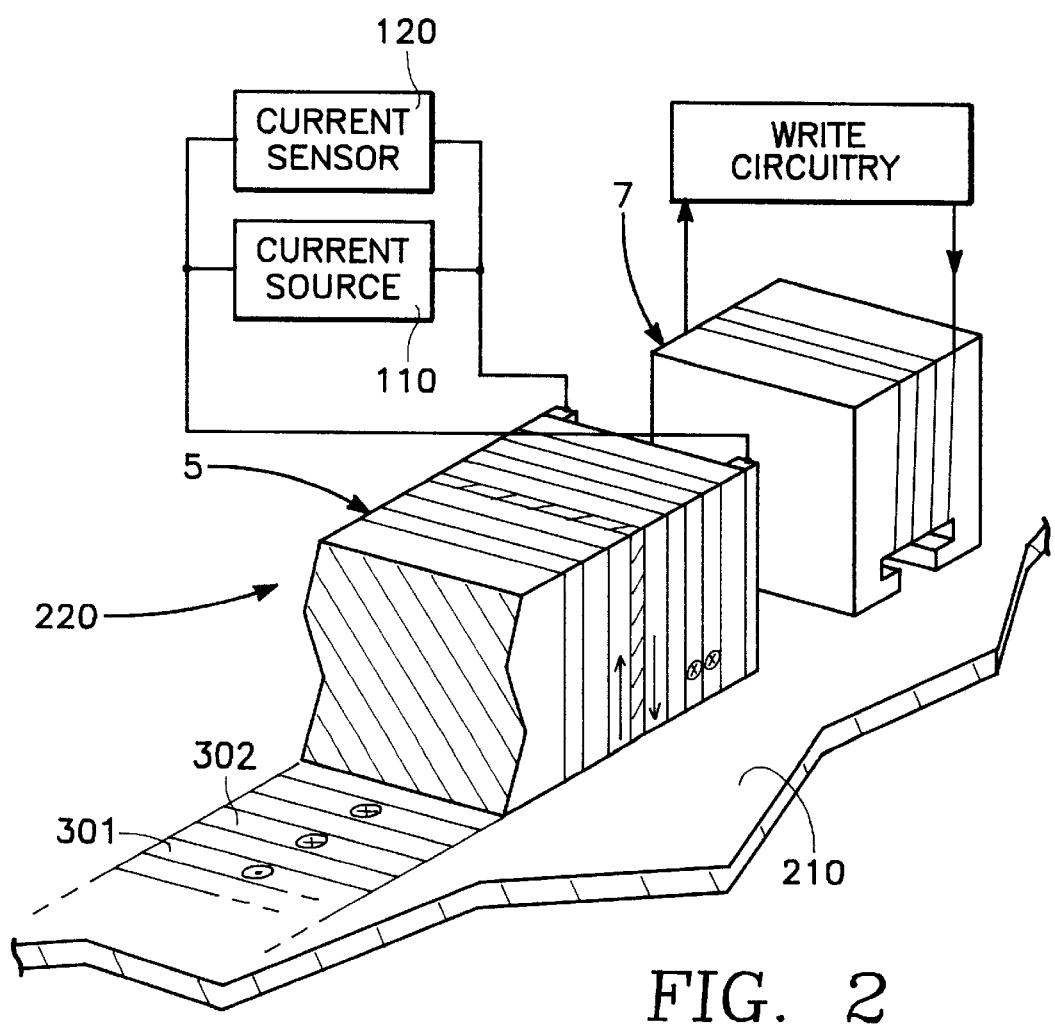
FIG. 2 is a simplified functional illustration of a head assembly shown in exploded perspective view.

FIG. 2 shows a simplified functional illustration of the head assembly 220. Merged head assemblies 220 are formed having a write head 7, used to write or set the magnetization of bits 301, 302 on the media 210, while a read head 5, reads the magnetization of those bits 301, 302 from the media 210. The depiction in FIG. 2 is a functional representation of a merged head, the merged head of the present invention may be formed by techniques well know in the art, such as by masking, depositing, and etching successive layers to form the well known structures of the merged head 220.

Figure 3:
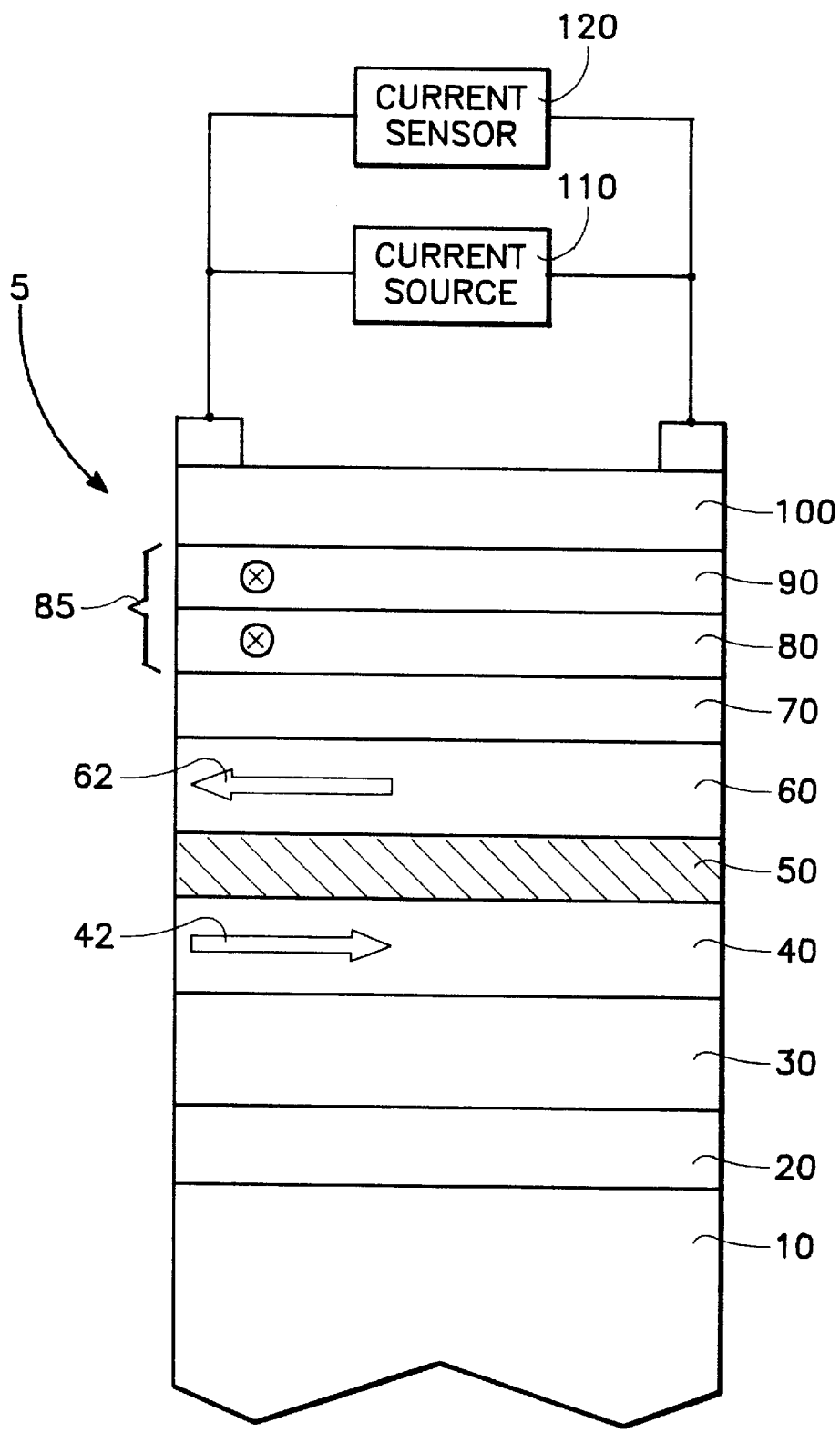
FIG. 3 is a sectional view of a bottom synthetic spin valve sensor in accordance with the present invention.

FIG. 3 shows a possible structure of the spin valve read sensor 5 of the present invention. The structure of the spin valve 5 of the present invention may comprise: a substrate 10, a seed layer 20, a pinning layer 30, a first pinned layer 40, a high resistivity antiparallel coupling layer 50, a second pinned layer 60, a spacer layer 70, a free layer 85 which may comprise a first free layer portion 80 and a second free layer portion 90, and a capping layer 100. The spin valve 5 of the present invention may be fabricated using techniques well known in the art, such as for example by sputtering.

The substrate 10 may be silicon, glass, ceramic, or the like. The seed layer 20 typically is formed of tantalum. Tantalum typically is deposited to provide a suitable lattice structure to better control the structure and deposition of subsequent layers. It is preferred to deposit the tantalum layer so that it forms with high resistivity in its β phase. It is also possible to use zirconium, deposited in its 1,1,1 or FCC orientation, or any other material providing high resistivity, good thermal stability, and zero magnetic moment, as seed layer 20.

The pinning layer 30 comprises an antiferromagnetic material such as FeMn, IrMn, NiMn, PtMn, PtPdMn, or any other Mn based antiferromagnetic material. It is also possible to use other known antiferromagnetic materials such as NiO, NiCoO, or the like, or any known antiferromagnetic material. The domain state of the antiferromagnetic or AFM pinning layer 30 may be set after deposition by heating the pinning layer 30 above its blocking temperature and then cooling it in the presence of an applied magnetic field. The applied magnetic field aligns the domain state of the adjacent pinned layer 40 which fixes the domain state of the pinning layer 30 as temperature drops below the blocking temperature. Setting the domain state of the pinning layer 30 by this annealing process may be done after all the layers 30–100 have been deposited.

The first pinned layer 40 is deposited adjacent the pinning layer 30. The first pinned layer 40 may be formed of Co, Fe, Ni or their alloys. Typically, the first pinned layer 40 is formed of CoFe. The magnetic moment of the first pinned layer 40 is pinned by exchange field of the pinning layer 30 so that it can not be rotated by the magnetized bits on the recording media. An example of the orientation of the first pinned layer 40 is depicted by an arrow 42.

The high resistivity antiparallel coupling layer 50 is deposited adjacent the first pinned layer 40 so that it separates the first pinned layer 40 and the second pinned layer 60. The material of the antiparallel coupling layer 50 is selected to provide antiparallel coupling between the first pinned layer 40 and the second pinned layer 60. An arrow 62 depicts the antiparallel magnetic moment of the second pinned layer 60 with respect to the first pinned layer 40.

The high resistivity antiparallel coupling layer 50 of the present invention is formed of Rhenium (symbol: Re, atomic number 75). Rhenium provides improved GMR while providing sufficient antiparallel coupling between the pinned layers 40 & 60. Re improves the GMR of the spin valve by providing a higher resistivity than that typically employed in spin valve devices. For example, prior art devices, such as the ones disclosed in U.S. Pat. No. 5,701,223, by Fontana, Jr. et al., issued on Dec. 23, 1997, entitled SPIN VALVE MANETORESISTIVE SENSOR WITH ANTIPARALLEL PINNED LAYER AND IMPROVED EXCHANGE BIAS LAYER, AND MAGNETIC RECORDING SYSTEM USING THE SENSOR, and in U.S. Pat. No. 5,465,185, by Heim, et al., issued on Nov. 7, 1995, entitled MAGNETORESISTIVE SPIN VALVE SENSOR WITH IMPROVED PINNED FERROMAGNETIC LAYER AND MAGNETIC RECORDING SYSTEM USING THE SENSOR, both herein incorporated by reference in their entireties, disclose preferably selecting ruthenium (symbol: Ru, atomic number 44) for the antiparallel coupling layer 50. Re, however, provides an advantage over Ru and the other elements disclosed for possible use by the incorporated references in that it has a higher resistivity. Re has a resistivity of about 18.4 microhm-centimeters, whereas Ru has about 7.3 microhm-centimeters. As a result of its increased resistivity, Re provides increased performance over prior art spin valve devices.

By using a high resistivity antiparallel coupling layer, the present invention decreases shunt current through the antiparallel coupling layer. Since the magnetic state of the bits on the recording media are detected by supplying current through the spin valve to detect changes in resistance of the spin valve, decreasing the shunt current across the spin valve increases the GMR effect. The antiparallel coupling layer of the present invention, therefore, will provide increased GMR effect for the spin valve sensor of the present invention while maintaining sufficient interlayer coupling between the pinned layers 40 & 60 to prevent the bits on the magnetic media from causing the magnetic moment of the second pinned layer 60 from decoupling from the first pinned layer 40.

As such, the thickness of the high resistivity antiparallel coupling layer 50 should be selected so as to minimize its cross sectional area to reduce its resistance while maintaining the proper thickness to provide sufficient antiparallel coupling between the pinned layers 40 & 60. The optimum thickness of the antiparallel coupling layer 50 is expected to be in the range of about 4 to 10 Angstroms with 5 Angstroms being the favored thickness.

Another advantage of Re is that it provides increased thermal stability over Ru when annealed. This reduces interlayer diffusion at higher temperatures. The heat of mixing, a measure of interaction of two materials, is about +1 kJ/gat for Co/Re and about −1 kJ/gat for Co/Ru. As such, a Co/Re multilayer is thermally stable up to about 300 degrees Celsius, whereas a Co/Ru multilayer is thermally stable only up to about 250 degrees Celsius. In view of this, CoFe/Re is expected to have increased thermal stability over CoFe/Ru. As a result, the current through the spin valve of the present invention can be increased without the corresponding increase in electrically generated heat causing interdiffusion between the layers. The increased thermal stability not only allows for increased current through the spin valve, it provides a greater temperature margin when setting the magnetization of the pinning layer 30 and also expands the possible materials that can be used in the pinning layer 30. Consequently, materials with higher blocking temperatures may be used for the pinning layer 30.

Moreover, the increased thermal stability provided by Re would help prevent interdiffusion caused by media induced thermal spiking, which can occur during disk drive operation. Thermal spiking, which occurs as a result of media asperities, may be reduced by more closely controlling media fabrication. This solution, however, increases the cost of media fabrication. Reducing susceptibility to thermal spiking, therefore, would ease media fabrication constraints and reduce media fabrication costs. Therefore, the present invention provides an antiparallel coupling layer with increased thermal stability so as to improve fabrication and performance, and in addition, it may provide high resistivity as discussed above.

The free layer 85 is separated from the pinned layers 40 & 60 by spacer layer 70. Typically, spacer layer 70 is formed of a metallic nonferromagnetic material such as Cu, Ag, or Au. The free layer 85, therefore, is free to rotate in the presence of the magnetic field produced by the magnetic media. The free layer 85 may be formed of a first free layer 80 and a second free layer 90. The first and second free layers 80 & 90 may be formed of CoFe and NiFe respectively. The first free layer 80 may be formed of Co or its alloys to prevent interdiffusion between the NiFe of the second free layer 90 and the Cu of the spacer layer 70. It also enhances the GMR effect. Typically, a hard bias layer (not shown) would be located adjacent the second free layer 90 to set the magnetic moment of the free layer 85.

Unlike the pinned layers 40 & 60, the magnetization of the free layer 85 is free to rotate in the presence of the externally applied field of the recording media thereby altering the resistance of the spin valve. Typically, a field of about 40–100 Oersteds, produced by the recording media, will cause the magnetization of the free layer to rotate thereby providing a detectible change in resistance of the spin valve.

A tantalum cap 100 typically is applied over the free layer 90 to prevent oxidation. The tantalum capping layer 100 may be deposited in its high resistivity β phase.

Although the spin valve 5 of FIG. 3 is represented as what may be called a bottom spin valve, it is also possible to fabricate any other type of spin valve.

Figure 4:
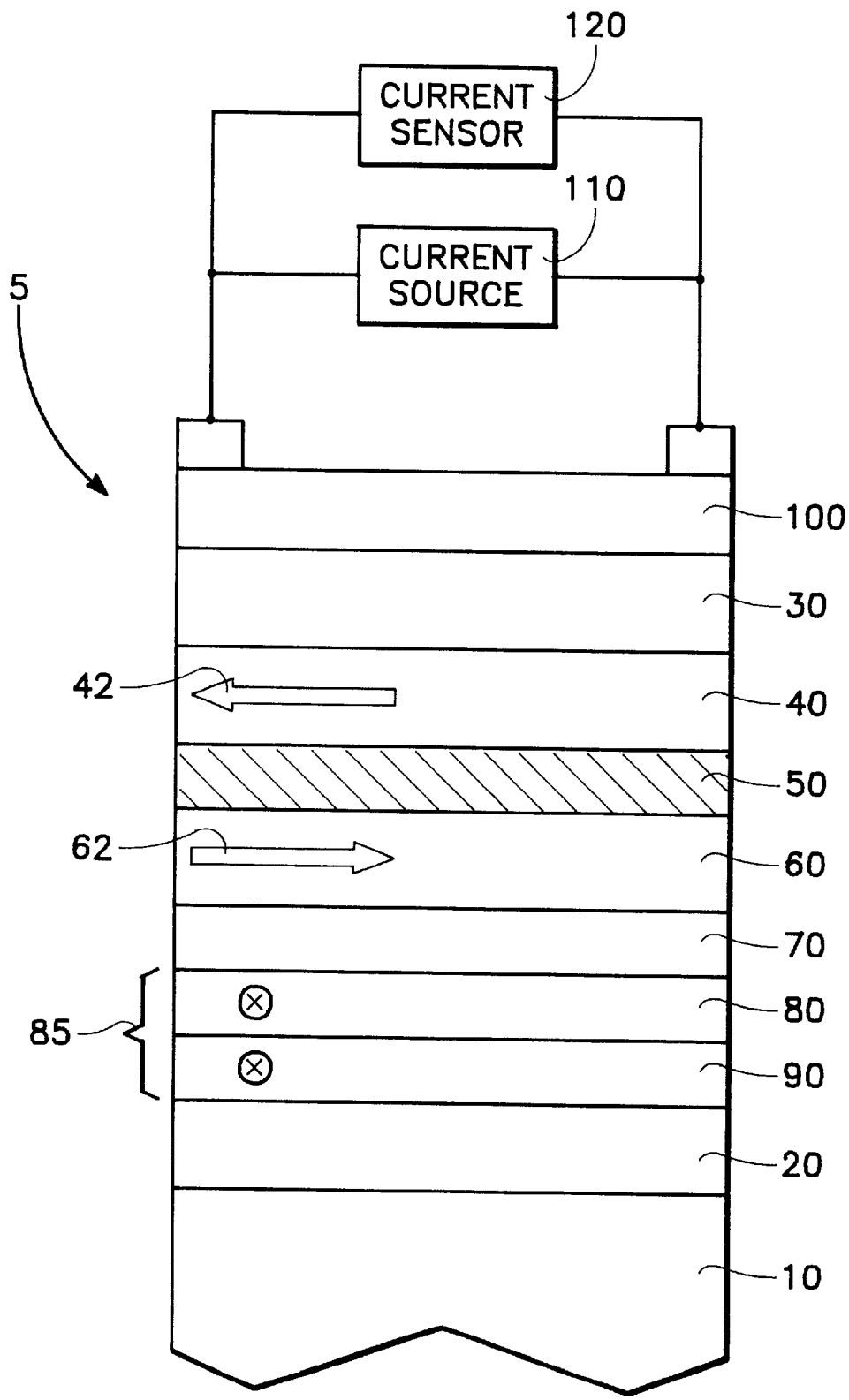
FIG. 4 is a sectional view of a top synthetic spin valve sensor in accordance with the present invention.

FIG. 4 shows one of several possible alternate structures for the spin valve read sensor 5 of the present invention. The alternate structure of the spin valve 5 of FIG. 4 may comprise: a substrate 10, a seed layer 20, a free layer 85 that may comprise a first free layer portion 80 and a second free layer portion 90, a spacer layer 70, a second pinned layer 60, a high resistivity antiparallel coupling layer 50, a first pinned layer 40, a pinning layer 30, and a capping layer 100.

The seed layer 20 typically is formed of tantalum. Tantalum typically is deposited to provide a suitable lattice structure to better control the structure and deposition of subsequent layers. It is preferred to deposit the tantalum layer so that it forms with high resistivity in its β phase. It is also possible to use zirconium, deposited in its 1, 1, 1 or FCC orientation, or any other material providing high resistivity, good thermal stability, and zero magnetic moment, as seed layer 20.

In the embodiment of FIG. 4, which can be referred to as a top synthetic spin-valve, it is preferred to form the pinning layer 30 of an antiferromagnetic material such as FeMn, IrMn, NiMn, PtMn, PtPdMn, or any other Mn based antiferromagnetic material. It is also possible to use other known antiferromagnetic materials such as NiO, NiCoO, or the like, or any known antiferromagnetic material. The other layers are formed as discussed with respect to FIG. 3 to provide the advantages discuss above.

Figure 5:
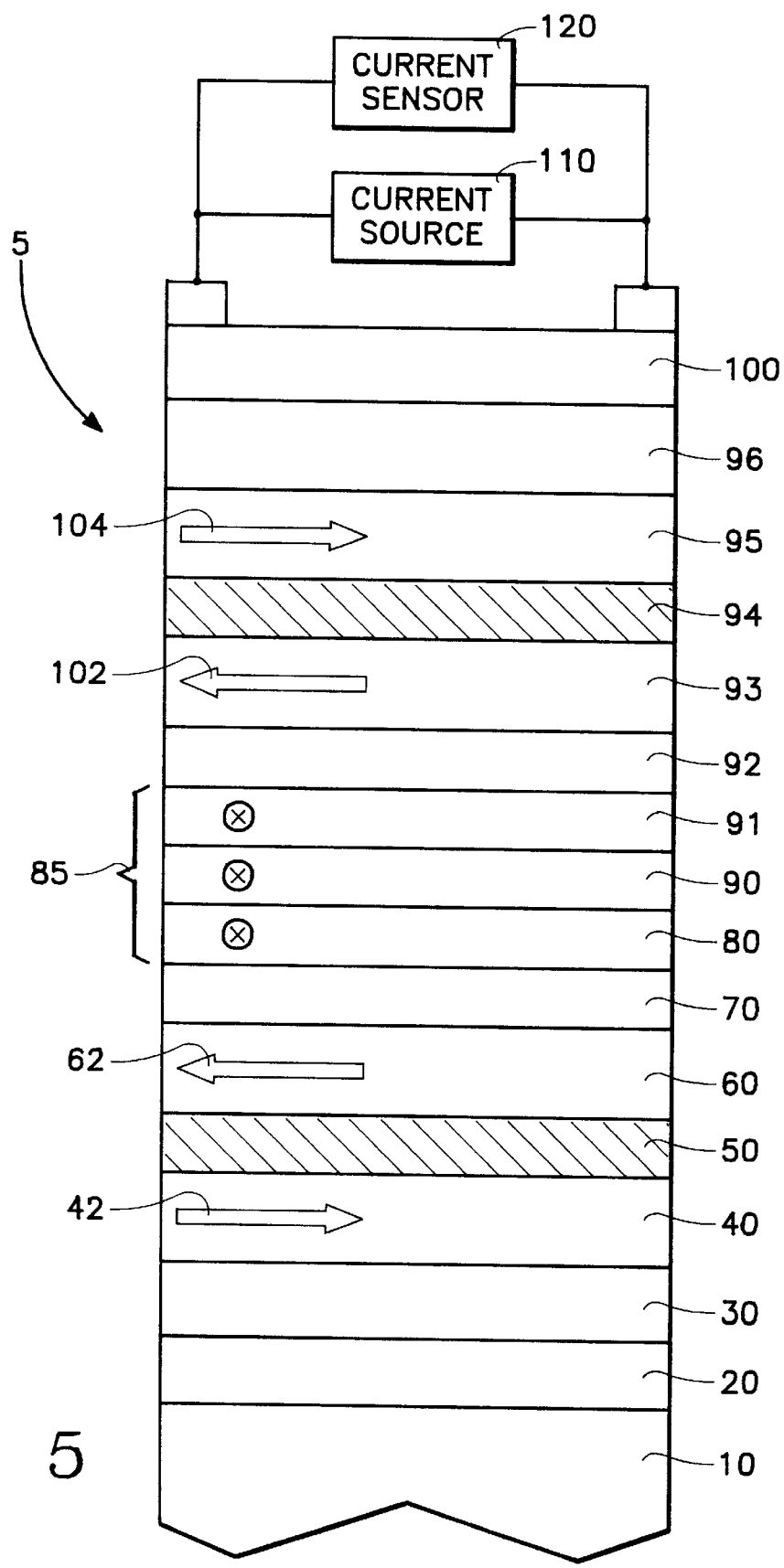
FIG. 5 is a sectional view of a dual synthetic spin valve sensor in accordance with the present invention.

FIG. 5 illustrates yet another possible structure for the spin valve read sensor 5 of the present invention. The alternate structure of the spin valve 5 of FIG. 5 may comprise: a substrate 10; a seed layer 20; a first pinned layer 40; a high resistivity antiparallel coupling layer 50; a second pinned layer 60; spacer layer 70; a free layer 85 that may comprise a first free layer portion 80, a second free layer portion 90, and a third free layer portion 91; a spacer layer 92; a fourth pinned layer 93; a high resistivity antiparallel coupling layer 94; a fifth pinned layer 95; a second pinning layer 96; and a capping layer 100.

With the embodiment of FIG. 5, it is presently preferred to form the pinning layer 30 of an antiferromagnetic material such as NiO, NiCoO, or the like while forming the second pinning layer 96 of an antiferromagnetic material such as IrMn, PtMn, PtPdMn, NiMn, or any other Mn based antiferromagnetic material. Either antiferromagnetic pinning layer 30, 96, however, may be formed as discussed with the pinning layers of FIGS. 3 & 4.

The third free layer portion 91 may be formed of Co, Fe, Ni or their alloys. Typically, the third free layer 91 is formed of CoFe. The third free layer is also free to rotate along with free layers 80 & 90.

The spacer layers 70 & 92 are formed of a metallic nonferromagnetic material such as Cu, Ag, or Au. The free layer 85, therefore, is free to rotate in the presence of the magnetic field produced by the magnetic media. The free layer 85 may be formed of a first free layer 80, a second free layer 90, and a third free layer 91. The second free layer may be formed of NiFe with an adjacent hard bias layer (not shown). The first and third free layers 80 & 91 may be form of Co or its alloys, such as CoFe, to prevent interdiffusion between the NiFe and the Cu of the spacer layers 70 & 92 and to enhance the GMR effect.

The fourth pinned layer 95 is located adjacent the second pinning layer 96 so that the magnetic moment of the second pinning layer 96 is pinned so that it can not be rotated by the magnetized bits on the recording media. The domain state of the second pinning layer 96 may be set by annealing as discussed above. An example of the orientation of the fourth pinned layer 95 is depicted by arrow 104.

The high resistivity antiparallel coupling layer 94 of the present invention couples the third pinned layer 93 in an antiparallel relationship to the fourth pinned layer 95. The respective magnetic moment of the third pinned layer 93 is depicted by arrow 102. The high resistivity antiparallel coupling layer 94 of the present invention is preferably formed of Re to provide the advantages discussed above. Additionally, the other layers of FIG. 5 may be formed as discussed above.

As discussed above, using a high resistivity material such as Re significantly reduces shunt current through the antiparallel coupling layer. So, in addition to the other advantages discussed above, because the embodiment of FIG. 5 has two antiparallel coupling layers 50 and 94, the present invention provides an even greater reduction in the amount of shunt current through the spin valve sensor 5 of FIG. 5.

While the preferred embodiments of the present invention have been described in detail above, many changes to these embodiments may be made without departing from the true scope and teachings of the present invention. The present invention, therefore, is limited only as claimed below.

What we claim is:

1. A spin valve sensor comprising:
   a) a first layer capable of having a magnetic moment;
   b) a pinning layer adjacent the first layer, the pinning layer having sufficient exchange field to pin the magnetic moment of the first layer;
   c) a second layer capable of having a magnetic moment;
   d) a high resistivity antiparallel coupling layer between the first and second layers for causing the magnetic moment of the second layer to align antiparallel to the first layer, the high resistivity antiparallel coupling layer consisting essentially of Re;
   e) a free layer capable of changing magnetic orientation in response to an externally applied magnetic field;
   f) a spacer layer between the free layer and the second layer; and
   g) at least one of the first and second layers comprising at least one of Co, Fe, or Ni.

2. The spin valve sensor of claim 1 wherein the first and second layers are formed from the group consisting of Co, Fe, Ni, and their alloys.

3. The spin valve sensor of claim 1 wherein the first and second layers are formed from the group consisting of Co, Fe, Ni, and their alloys.

4. The spin valve sensor of claim 3 wherein the first and second layers consist essentially of CoFe.

5. The spin valve sensor of claim 1 wherein the first and second layers consist essentially of CoFe.

6. The spin valve sensor of claim 1 wherein the high resistivity antiparallel coupling layer and the first layer form an interface, and wherein the interface is thermally stable above 250 degrees Celsius.

7. The spin valve sensor of claim 1 wherein the high resistivity antiparallel coupling layer and the first layer form an interface, and wherein the interface is thermally stable above 250 degrees Celsius.

8. The spin valve sensor of claim 1 wherein the thickness of the high resistivity antiparallel coupling layer is in the range of approximately 4–10 Angstroms.

9. A data storage and retrieval apparatus comprising:
a) a magnetic recording media;
b) a head assembly positioned adjacent the magnetic recording media comprising:
   (i) a write head; and
   (ii) a read head comprising:
      (1) a first layer capable of having a magnetic moment;
      (2) a pinning layer adjacent the first layer, the pinning layer having sufficient exchange field to pin the magnetic moment of the first layer;
      (3) a second layer capable of having a magnetic moment;
      (4) a high resistivity antiparallel coupling layer between the first and second layers for causing the magnetic moment of the second layer to align antiparallel to the first layer, the high resistivity antiparallel coupling layer comprising Rhenium;
      (5) a free layer capable of changing magnetic orientation in response to an externally applied magnetic field;
      (6) a spacer layer between the free layer and the second layer; and
      (7) at least one of the first and second layers comprising at least one of Co, Fe, or Ni; and
c) a motor coupled to the media so as to move the media with respect to the head assembly.

10. The data storage and retrieval apparatus of claim 9 wherein the first and second layers are formed from the group consisting of Co, Fe, Ni, and their alloys.

11. The data storage and retrieval apparatus of claim 9 wherein the high resistivity antiparallel coupling layer consists essentially of Rhenium.

12. The data storage and retrieval apparatus of claim 9 wherein the high resistivity antiparallel coupling layer consists of Rhenium.

13. The data storage and retrieval apparatus of claim 9 wherein the high resistivity antiparallel coupling layer and the first layer form an interface, and wherein the interface is thermally stable above 250 degrees Celsius.

14. The data storage device of claim 11 wherein both the first and second layers consist essentially of CoFe.

15. The data storage device of claim 12 wherein both of the first and second layers consist of CoFe.

16. A spin valve sensor comprising:
a) a first layer capable of having a magnetic moment;
b) a pinning layer adjacent the first layer, the pinning layer having sufficient exchange field to pin the magnetic moment of the first layer;
c) a second layer capable of having a magnetic moment;
d) an antiparallel coupling layer between the first and second layers for causing the magnetic moment of the second layer to align antiparallel to the first layer, the antiparallel coupling layer being thermally stable above 250 degrees Celsius;
e) a free layer capable of changing magnetic orientation in response to an externally applied magnetic field; and
f) a spacer layer between the free layer and the second layer.

17. The spin valve sensor of claim 16 wherein the antiparallel coupling layer comprises Re.

18. The spin valve sensor of claim 17 wherein the first and the second layers are formed from the group consisting of Co, Fe, Ni, and their alloys.

19. The spin valve of claim 16 wherein at least one of the first and second layers consists of CoFe.

20. The spin valve of claim 16 wherein the first and second layers comprise CoFe.

21. The spin valve of claim 17 wherein at least one of the first and second layers consists of CoFe.

22. The spin valve of claim 21 wherein the first and second layers consist of CoFe.

23. The spin valve of claim 19 wherein the first and second layers consist of CoFe.

* * * * *

UNITED STATES PATENT AND TRADEMARK OFFICE
CERTIFICATE OF CORRECTION

PATENT NO.    : 6,175,476 B1  Page 1 of 1
DATED         : January 16, 2001
INVENTOR(S)   : Yiming Huai and Marcos Lederman It is certified that error appears in the above-identified patent and that said Letters Patent is hereby corrected as shown below:

Column 7,
Lines 2-3, replace "are formed from the group consisting of Co, Fe, Ni, and their alloys" with -- consist of CoFe --

Column 8,
Lines 27-28, in d), replace "being thermally stable above 250 degrees Celsius" at Col. 8 lines 27-28 with -- comprising Re --
Line 30, in part e), delete "and" following the semicolon
Line 32, in part f), following "layer" insert -- ; and g) at least one of the first and second layers comprising at least one of Co, Fe, or Ni --
Lines 36-37, replace "are formed from the group consisting of Co, Fe, Ni, and their alloys" with -- comprise CoFe --

Signed and Sealed this

Fifteenth Day of October, 2002

*Attest:*

*Attesting Officer*

JAMES E. ROGAN
*Director of the United States Patent and Trademark Office*